United States Patent [19]

Farley et al.

[11] 4,110,026

[45] Aug. 29, 1978

[54] DISCHARGER APPARATUS FOR PHOTOCONDUCTORS

[75] Inventors: Ronald William Farley; Donald Luke Smith, both of Rochester, N.Y.

[73] Assignee: Eastman Kodak Company, Rochester, N.Y.

[21] Appl. No.: 776,081

[22] Filed: Mar. 9, 1977

[51] Int. Cl.[2] .............................................. G03B 27/00

[52] U.S. Cl. ..................................... 355/3 R; 355/16; 362/31

[58] Field of Search ............... 355/1, 3 R, 16; 362/26, 362/31, 84

[56] References Cited

U.S. PATENT DOCUMENTS

| | | | |
|---|---|---|---|
| 2,225,439 | 12/1940 | Arens et al. | 250/487 |
| 3,504,969 | 4/1970 | Martel | 355/3 R |
| 3,546,438 | 12/1970 | Buc et al. | 362/31 X |

*Primary Examiner*—Richard L. Moses
*Attorney, Agent, or Firm*—Raymond L. Owens

[57] ABSTRACT

A fluorescent light concentrator is disclosed for flooding an electrophotographic photoconductor with light having spectral characteristics matched to those of the photoconductor to effectively discharge the photoconductor. In the disclosed embodiment, a single fluorescent light concentrator transmits light to two spaced locations to simultaneously discharge the photoconductor at such locations which may for example be prior to charging or sensitization and after image development.

8 Claims, 3 Drawing Figures

DISCHARGER APPARATUS FOR PHOTOCONDUCTORS

BACKGROUND OF THE INVENTION

1. Field of the Invention

This invention relates to apparatus for discharging an electrographic photoconductor as it moves along an endless path.

2. Description of the Prior Art

In a common form of electrographic copy/duplicator apparatus, an electrical image is formed on an electrographic photoconductor in response to image-wise actinic radiation from a document to be copied. The photoconductor includes a photoconductive layer with a conductive backing. Typically in the absence of light, the photoconductive layer accepts charge. When subject to light, the photoconductive layer becomes conductive and discharges through the conductive backing. In operation, the photoconductor is transported along an endless path relative to a plurality of work stations, each of which is operative when actuated to perform a work operation on the photoconductor.

Certain photoconductors, such as organic photoconductors exhibit a form of electrical fatigue that results in a "residual image" of a previous exposure being formed in initial copies of a new document.

This residual image or memory effect is believed to be caused by the accumulation of electrons trapped within the volume of the photoconductor in an image-wise pattern corresponding to the dark portion of the previous document image. The speed (rate of discharge per unit exposure) of the photoconductor is decreased by this accumulation of trapped electrons so that, upon exposure to a new document, the image area of the photoconductor associated with the previous document pattern is discharged less than other photoconductor portions and is developed with toner as a background image. It will be readily appreciated that such a background image is detractive from an esthetic viewpoint; and, the provision of previous document information in the subsequent document copies may present a serious problem when proprietary information is embodied in the previous document.

It is well known that fatigue of the type causing the residual image effect in photoconductors can be relieved to some extent by discharging such photoconductors by, flooding them with light or by heating, them (see for example U.S. Pat. No. 2,863,767 and *Electrophotography* by R. M. Schaffert, 2nd Edition, 1975, page 167). Typically this is accomplished just after the development station and before any subsequent sensitizing or charging of the photoconductor. It is also quite common practice to discharge a photoconductor by flooding light on it just prior to cleaning. This not only aids in cleaning but also conditions the photoconductor for primary charging or sensitizing.

The spectral characteristics of the photoconductor, of course, depend upon its particular construction. For the sake of illustration let us assume that to effectively discharge a particular photoconductor, it's spectral characteristics are such that, preferably, it should be illuminated with light having a substantial component of "red" visible light. In order to discharge an organic photoconductor special purpose commerically available fluorescent lamps are frequently employed. For example, a Sylvania, F17 1/4 T5/RS lamp has been mounted using conventional electrical components in proximity to the back of a transparent organic photoconductor. A suitable refector surrounds the portion of the lamp not facing the photoconductor to maximize the light incident on the photoconductor. While such special purpose fluorescent lamps can perform satisfactorily, they typically have a limited life, have a relatively high cost and provide light which does not precisely match the spectral characteristics of the photoconductor and thus waste energy. Heretofore when it was desired to discharge a photoconductor both after development and prior to sensitizing, two special purpose fluorescent lamps were provided.

SUMMARY OF THE INVENTION

In accordance with the invention it has been determined that a "Fluorescent Concentrator" can effectively provide light which matches the spectral (discharge) characteristics of a photoconductor. Before going further, however, it should be noted that Surcliff and Jones in the *Journal of the Optical Society of America,* Vol. 39 number 11, pp. 912–916 (November 1949) describes the operation of fluorescent light concentration in detail. See also U.S. Pat. No. 2,225,439. The present invention uses a fluorescent concentrator which in the presence of a relatively weak source of radiation say, from a standard commercially available fluorescent lamp causes dye in the concentrator to fluoresce in a portion of the spectrum determined by such dye. By a proper selection of dye, a concentrator can fluoresce to provide light which is matched to the spectral characteristics of the photoconductor. The fluorescent light produced by the concentrator, which may be in the form of a flat plate member, is directed by internal reflection off the top and bottom surfaces of the plate to end surfaces of the concentrator. Light from these end surfaces illuminates the photoconductor and causes it to discharge.

It is a feature of the invention that a single fluorescent concentrator can be used to simultaneously illuminate a photoconductor at two or more separated locations. This feature provides design flexibility which eliminates the need for one or more lamps used in prior art apparatus.

Frequently copier manufacturers purchase special purpose fluorescent erase or discharge lamps. The rated life for such lamps in current copiers is typically from about 3,000 to 6,000 hours. The present invention may employ a standard fluorescent light bulb which typically may have a rated life of from about 12,000 to 24,000 hours. Fluorescent concentrators are limited only by the fading of the dye. It is a characteristics of fluorescent lamps that as they age, the intensity of their light drops. This drop is most dramatic at the ends of the bulb, causing a darkening of the bulb and an uneven light distribution along the length of the bulb. This is a problem with prior art special purpose fluorescent discharge lamps where the different portions of the photoconductor may be discharged to different levels. In accordance with the invention, the fluorescent concentrator compensates for this condition as it yields a fairly uniform distribution of light from the end surfaces irrespective of the aging of the input light source. A reason for this is that the light reaching such end surfaces has been produced by the effervescence of the dye in the concentrator which is uniform in all directions.

DETAILED DESCRIPTION OF THE PREFERRED EMBODIMENT

Figure 1:
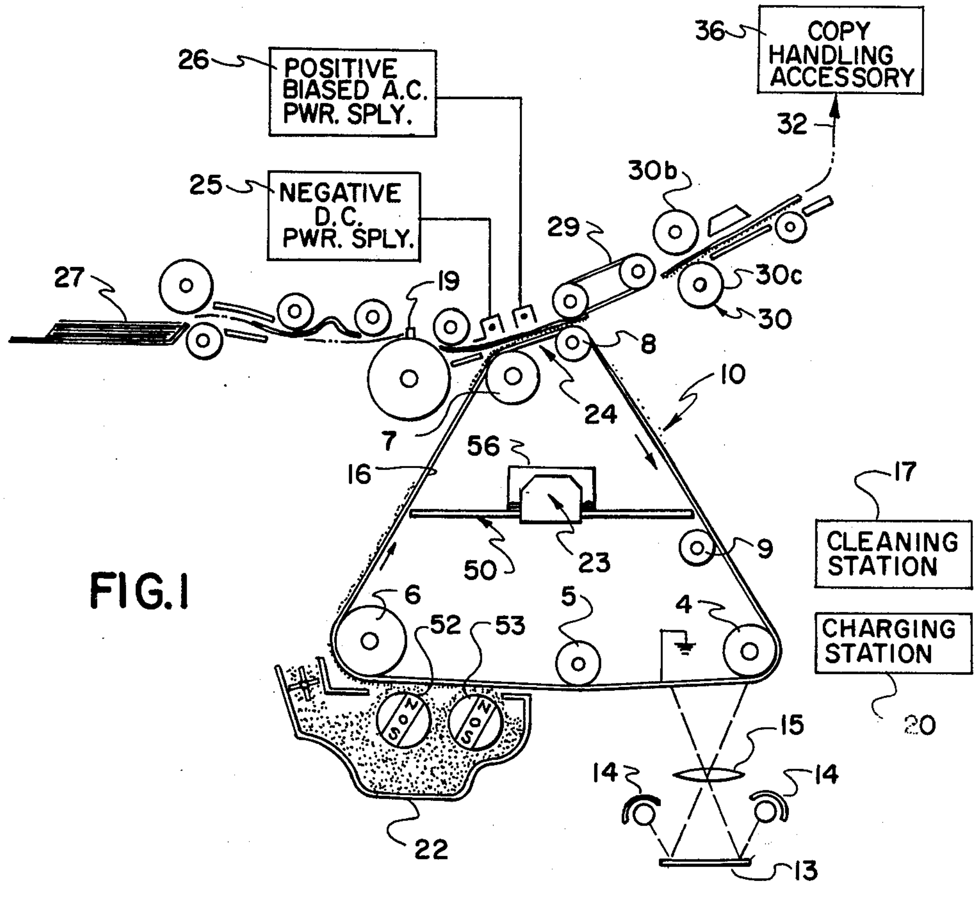
FIG. 1 is a diagrammatic representation showing the general arrangement of a web type electrophotographic copy/duplicator apparatus embodying a discharge apparatus in accordance with the invention.

To assist the understanding of the present invention the operation of an electrographic copier or duplicator machine in which the invention may be used will be briefly described. For a specific example of such a machine, see commonly assigned U.S. Pat. No. 3,914,047 issued Oct. 21, 1975, to Hunt et al. It is to be understood, however, that the apparatus of the present invention could be used with equal facility and advantage in other copy/duplicator apparatus and, therefore, the following description of apparatus 10 related to but not forming part of the invention is provided for illustrative purposes only.

As shown, at an exposure station, an information medium such as a document 13 is illuminated by radiation from Xenon flash lamps 14 when they are actuated. Such radiation is reflected from the medium and focused by a lens 15 onto a charged photoconductor, shown as a web member 16, to selectively dissipate charge and form an electrostatic latent image. It will be understood that the exposure station may include a programmable power supply for the Xenon flash lamps 14. V (white) is the voltage on the photoconductor after discharge at the exposure station of a white background and is a parameter which effects the image of the copy being produced. Stated differently, the low charge level V(white) areas (exposed) produce the clear or white background on the copy paper. The remaining higher charged areas (unexposed) are developed to become the black area or lines of the copy. As is well understood, if the V(white) charge level should rise, there would be an unwanted development in the background areas producing a gray background on the finished copy.

Figure 3:
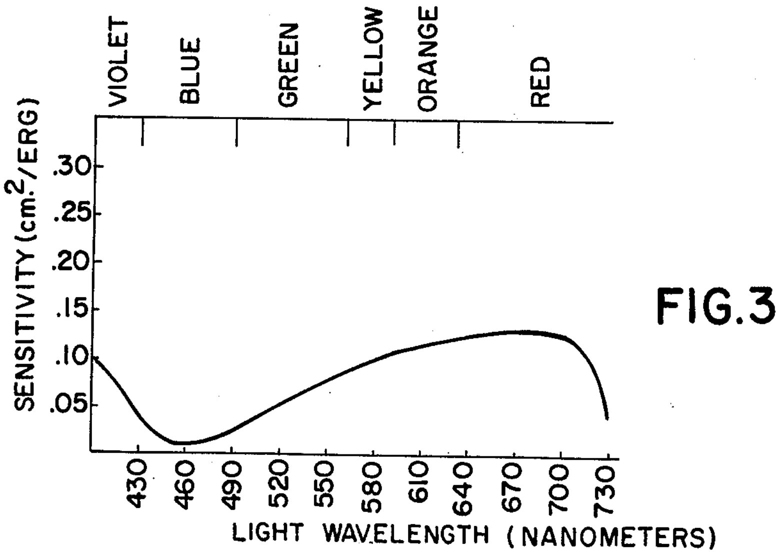
FIG. 3 is a graph which shows the spectral characteristics of an organic photoconductor which can be used in the apparatus of FIG. 1.

The web member 16 is trained about rollers 4 through 9 (only one of which may provide the driving force) and is uniformly charged at a charging station 20 with a negative DC charge. The web member 16 moves along an endless path in direction shown by the arrows. Rollers 4, 6, 7 and 8 provide a web tracking function, while rollers 5 and 9 provide a tensioning function. An example of a passive web tracking apparatus which may be adapted for use with the web member 16 is shown in commonly assigned U.S. Pat. No. 3,974,952 issued Aug. 17, 1976 to Swanke et al. The charging station 20 includes a power supply and a corona wire structure (both not shown) which are operative to provide a generally uniform electrostatic charge on the web 16. Assuming that the information on the document 13 is black on a white background, the photoconductive layer of web member 16 when exposed to the projected document image is rendered conductive and discharges in areas corresponding to the white background of the document. The web member 16 which is relatively transparent may be an "organic" photoconductor which includes a photoconductive coating layer with a conductive backing coating mounted on a polyester support base. More specifically, an organic photoconductor may be constructed in successive layers or coatings on a transparent plastic support base. For a three layer photoconductor, the first layer is the base or support. The second layer may be a very thin layer of a metallic compound which is electrically conductive, yet thin enough to pass light. The third or outer layer is the organic photoconductive layer (OPC). The OPC layer is basically a mixture of three ingredients: a photoconductive material, a binder which serves to hold the mixture together, and a sensitizing dye which imparts the desired spectral response or color sensitivity to the photoconductor. The dye gives the photoconductor its color say, for example blue. For more specific disclosures, see commonly-assigned U.S. Pat. Nos.: 3,615,406 and 3,615,414 both issued Oct. 26, 1971. FIG. 3 shows the spectral characteristics of a particular photoconductor which is shown for illustrative purposes and may be used in the FIG. 1 apparatus.

The apparatus 10 further includes a magnetic brush development station 22 at which the latent electrostatic image on the moving web is contacted by triboelectrically positive charged toner particles formed from a fine thermoplastic powder. The particles adhere by electrostatic attraction to the negatively charged portions of the electrostatic image to develop and render such image visible in an image-wise configuration. The development station 22 includes magnetic brushes 52 and 53. An example of suitable development station 22 is set forth in commonly assigned U.S. Pat. No. 3,543,720 to Drexler et al.

In accordance with the invention, after the web member 16 exits from the development station, a discharging apparatus 23, which will be described more fully later, continuously floods with "red" light the toned or developed electrostatic image to reduce possible photoconductor fatigue (deterioration resulting from prolonged charge). It should be noted that the web photoconductor 16 is illuminated from its transparent support side. This prevents shadows of the toner particles from interferring with the discharge action of the light. The intensity and time the flooding light illuminates a toned image are selected so that such light flooding discharges the photoconductor to a level lower than the residual voltage at the exposure station which corresponds to the white background, i.e. V (white). It should be noted that some of the negative charge does remain on the photoconductor. This discharge process can be done because the high level of charge required for proper development is no longer needed. Moreover, it is quite desirable since by reducing this charge level, electrostatic stresses are reduced, which thereby aid in extending photoconductor life, and helps prevent any residual image retention. The toner remains in its image-wise configuration on the surface of the web member 16 by cohesive and other forces of attraction. Also, because the toner is formed from a thermoplastic insulating material, it retains its positive charge even though it is illuminated by light from the discharge apparatus 23.

A transfer station 24 is provided to cause toner particles to be transferred in an image-wise configuration to a receiving surface of a copy sheet of paper which is fed from a paper supply 27 through a registration device 19 and then onto the surface of the web member 16 at the transfer station 24. The transfer station includes a negatively charged DC corona device 25 that applies a negative charge to the back of the copy paper, which draws the paper by electrostatic attraction into intimate contact with the web member 16. Due to the charge gradient between the paper and the photoconductive layer of web member 16, the toner on the web member is transferred in an image-wise configuration onto the paper. The paper and web member 16 then move under an AC corona device 26 which removes the charge from the paper and renders it virtually neutral in charge. A positive bias is applied to the AC power supply for the corona 26 to overcome the tendency of balanced AC corona devices to produce a negative charge.

When the copy paper reaches the position on the web member 16 just above the roller 8, the web member 16 bends sharply around the roller and the beam strength of the paper coupled with the momentum of the moving paper causes the paper to leave the web member 16. A vacuum transport member 29 is located above the photoconductor at this point to convey the copy paper to a fusing station 30. At the fusing station 30, the toner is heated and fused into the paper to provide a final permanent copy. The copy paper then exits from the machine and is delivered along paper path 32 to a copy handling accessory 36 such as a sorter or a finisher.

The discharging apparatus 23 also illuminates the photoconductor 16 through its base layer just prior to the photoconductor entering cleaning station 17. The light from the apparatus 23 photoelectrically discharges the film by shining red light through the photoconductor 16 to discharge most of the negative charge remaining on the photoconductor 16. The photoconductor 16 is now conditioned for cleaning and charging at stations 17 and 20, respectively. The cleaning station removes residual toner from the conductive layer of the web member 16 prior to primary charging. Cleaning stations may take various forms known in the art such as a cleaning brush connected to a source of vacuum. The "primary" charging station 20 places a substantially uniform negative charge on the photoconductor. The photoconductor is now said to be sensitized in preparation for exposure and development of a document image. An example of a suitable primary charger is set forth in commonly assigned U.S. Pat. No. 3,527,941 issued Sept. 8, 1970 to Culhane et al.

Figure 2:
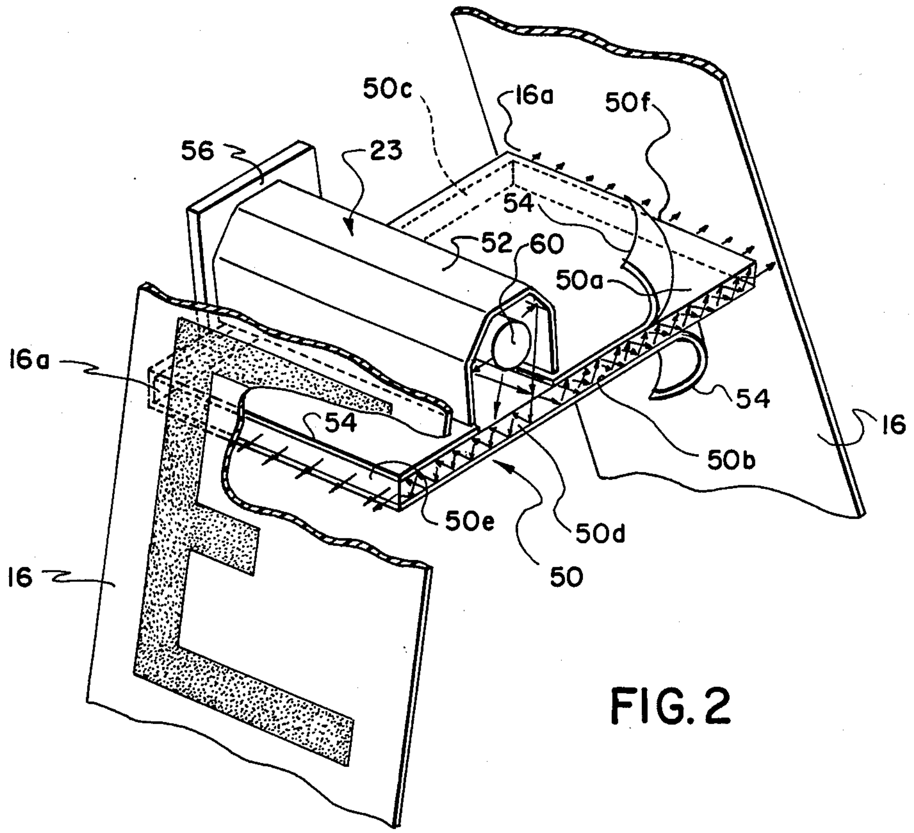
FIG. 2 is a pictorial representation, partially broken away, of an embodiment of the discharge apparatus shown in FIG. 1.

Turning now to FIG. 2, the discharge apparatus 23 of FIG. 1 is shown in more detail. Apparatus 23 includes a fluorescent concentrator in the form of a flat plate 50 and a U-shaped reflector housing 52 which surrounds a conventional fluorescent lamp 60. The plate 50, housing 52 and lamp 60 all are fixedly secured to mounting members 56. Only one of the members 56 is shown for clarity of illustration. The arrangement of apparatus 23 is such that light from the lamp 60 either directly illuminates a portion (disposed directly below the housing) of the top surface **50*a* of the plate 50 or is reflected by inside mirrored wall surfaces of the housing and members 56** to also illuminate such portion.

The plate 50 also defines a bottom surface **50*b*, two side surfaces 50*c* and 50*d* and two end surfaces 50*e* and 50*f*. As shown in FIG. 2 the surfaces 50*a* and 50*b* are covered with a reflective material 54. More specifically, the surface 50*a* is covered except for that portion of the surface 50*a* directly under the housing 52, with the reflective material 54 such as commercially available aluminum. An example of a suitable reflective material is ALZAK manufactured by the ALCOA Corporation. The function of the reflective material 54 is to reflect stray light back into the plate 50 and thereby cause the dye in the plate to increase the amount of fluoresence reaching the end surfaces 50*e* and 50*f* which faces the photoconductor 16. Both the side surfaces 50*c* and 50*d* are also to be covered with a reflective material. As illustrated, the reflective material has been removed from surface 50*d* to show the reflection of light rays at the plate surfaces 50*a* and 50*b*. Although the end surfaces 50*e* and 50*f*** are shown disposed adjacent the photoconductor, optical elements, such a lens system or light pipes or the like can be used to transmit light from the concentrator to the photoconductor.

Light from the end surfaces **50*e* and 50*f* of the concentrator 50 simultaneously discharges two spaced locations 16*a* of the photoconductor 16. Light from the surface 50*e* illuminates the photoconductor 16 downstream or just after the development station 22, while light from the surface 50*f* illuminates the photoconductor 16 upstream or just prior to the cleaning station 17. The photoconductor 16 is shown to carry a toner image (viz. the letter E) at the location 16*a* adjacent the end surface 50*e***.

In the concentrator 50, a dye should be chosen which will effervesce to produce light having substantial components in a region of the spectrum where the photoconductor peaks in response or sensitivity. Wavelengths outside this region help discharge photoconductor in direct proportion to the sensitivity of the photoconductor at such wavelengths. Thus, using the spectral response characteristics of FIG. 3, we will for illustrative purposes compare light at 460 nanometers (nm) relative to light at 700 nm by means of the following calculation.

$$\frac{\text{Effectiveness of 460 nm light}}{\text{Effectiveness of 700 nm light}} = \frac{.01}{.10} = .1$$

This calculation shows that light at 460 nm is 10 times less effective than light at 700 nm in discharging the photoconductor. This calculation also points out that a poor choice of a dye can cause a needless use of power to achieve a desired discharge of the photoconductor. The dye should be selected to produce substantial components of light in that portion of the light spectrum where the photoconductor is most sensitive.

A specific example will be set forth. FIG. 3 shows the spectral response curve of a representative organic photoconductor. As illustrated, this photoconductor is most sensitive to light in the yellow to red range of the light spectrum as compared with light produced in the blue range of the light spectrum. Thus "red" light produced by the fluorescent concentrator would effectively discharge the photoconductor. Commercially available from Rohm and Haas Company fluorescent Plexiglass (color 2085) 1/16 inch thick was used. The dye in this Plexiglass produces substantial light components in the red portion of the light spectrum where the photoconductor is most sensitive. Electric fluorescent lamp, Model No. F15T8 - CW (frequently used in household applications) was used to illuminate the concentrator. The light produced by this lamp had a broad spectrum i.e. "white" light. It will be understood that other light sources can be used in accordance with the invention. The photoconductor was charged to −450 volts (minus) and the discharge apparatus was found to effectively discharge the web to greater than −3 volts (in a negative sense) at different film speeds in the times given by the following data:

| Film Velocity in/Sec. | Concentrator no lamp | Concentrator lamp on | Time(Seconds) |
|---|---|---|---|
| 5 | −450 volts | −3 volts | .25 |
| 10 | −450 volts | −3 volts | .12 |
| 15 | −450 volts | −3 volts | .10 |
| 24 | −450 volts | −3 volts | .056 |

These data show that the voltage change from −450 to −3 volts occurred over the same length of photoconductor regardless of the photoconductor velocity. In still another test, the voltage applied to the ballast of the fluorescent lamp 60 was reduced from 120 to 90 volts, which, according to manufacturer's data, decreases the light output of the lamp by approximately 25%. The same discharge capability tests as before were performed with no noticeable change in results which indicates that there was more than enough power from the lamp 60 to discharge the photoconductor.

The invention has been described in detail with particular reference to a preferred embodiment thereof, but it will be understood that variations and modifications can be effected within the spirit and scope of the invention. For example, a fluorescent concentrator could readily be used to provide the illumination for interframe flash down of the photoconductor. Further, the invention is not limited to "organic" photoconductors, but can be employed with other photoconductors such as inorganic photoconductors. Still, further, although the disclosed photoconductor is in the form of a transparent web illuminated through its base support, the invention is suitable for use with a photoconductor (which may be opaque) disposed on a drum member, where flooding light usually would have to directly impinge on the photoconductive surface of the photoconductor.

We claim:

1. For use with an electrographic apparatus which includes a charged photoconductor which is dischargable by light and is more sensitive to light in a first portion of the light spectrum than in a second portion of the light spectrum, discharging apparatus for efficiently discharging the charged photoconductor, comprising: a fluorescent concentrator for producing light which floods the photoconductor at a predetermined location and wherein such concentrator includes dye which produces light that has substantial components in the first portion of the light spectrum.

2. The invention as set forth in claim 1 wherein the photoconductor is relatively transparent and includes a photoconductive layer with a conductive backing, said concentrator being mounted adjacent the photoconductor and provides flooding light to the photoconductive layer through the conductive backing.

3. The invention as set forth in claim 2 wherein said fluorescent concentrator includes an elongated plate member which contains said dye, said member defining a light receiving surface and an end surface disposed adjacent to the photoconductor at said predetermined location, said discharging apparatus including a fluorescent lamp which illuminates said light receiving surface causing said dye to produce light which is directed by said plate member out of said end surface to flood the photoconductor at said location.

4. For use with an electrographic apparatus which includes a charged photoconductor which is dischargable by light and is more sensitive to light in a first portion of the light spectrum than in a second portion of the light spectrum, the photoconductor being movable along a path, discharging apparatus for discharging the charged photoconductor at two spaced locations along the path, comprising: a fluorescent concentrator for producing light which floods the photoconductor at the spaced locations, and wherein such concentrator includes a dye which produces light that has substantial components in the first portion of the light spectrum, whereby the photoconductor is efficiently discharged.

5. The invention as set forth in claim 4 wherein the photoconductor is relatively transparent and includes a photoconductive layer with a conductive backing, said concentrator being mounted adjacent the photoconductor and provides flooding light to the photoconductive layer through the conductive backing.

6. The invention as set forth in claim 5 wherein said fluorescent concentrator includes an elongated plate member which contains said dye, said member defining a light receiving surface and end surfaces disposed adjacent to the photoconductor at said predetermined locations, said discharging apparatus including a fluorescent lamp which illuminates said light receiving surface causing said dye to produce light which is directed by said plate member out of said end surfaces to flood the photoconductor at said locations.

7. For use with an electrographic apparatus which includes a charged photoconductor web member which is dischargable by light and is more sensitive to light in a first portion of the light spectrum than in a second portion of the light spectrum, the web member being movable along an endless path past work stations which provide work operations on it, such work stations including a primary charger and a development station, discharging apparatus disposed inside the endless path for discharging the charged web member at two spaced locations disposed up stream of the primary charger and downstream of the development station relative to movement of the web member past such stations, respectively, comprising:

(a) a fluorescent concentrator including:

(i) an elongated plate member having an dye selected to produce light which has substantial components in the first portion of the first light spectrum, said plate member defining a light receiving surface and two spaced end surfaces disposed adjacent to the web member at said spaced locations, respectively; and (b) a source of light for illuminating said light receiving surface causing said dye to produce light which is directed by said plate member out of said end surfaces to flood the web member at the spaced locations.

8. The invention as set forth in claim 7, wherein the web member is relatively transparent and includes a photoconductive layer with a conductive backing, said concentrator being mounted adjacent the photoconductor and provides flooding light to the photoconductive layer through the conductive backing.

* * * * *